May 8, 1934.　　　　G. G. MORENO　　　　1,957,974
FILM MAGAZINE
Filed June 29, 1931
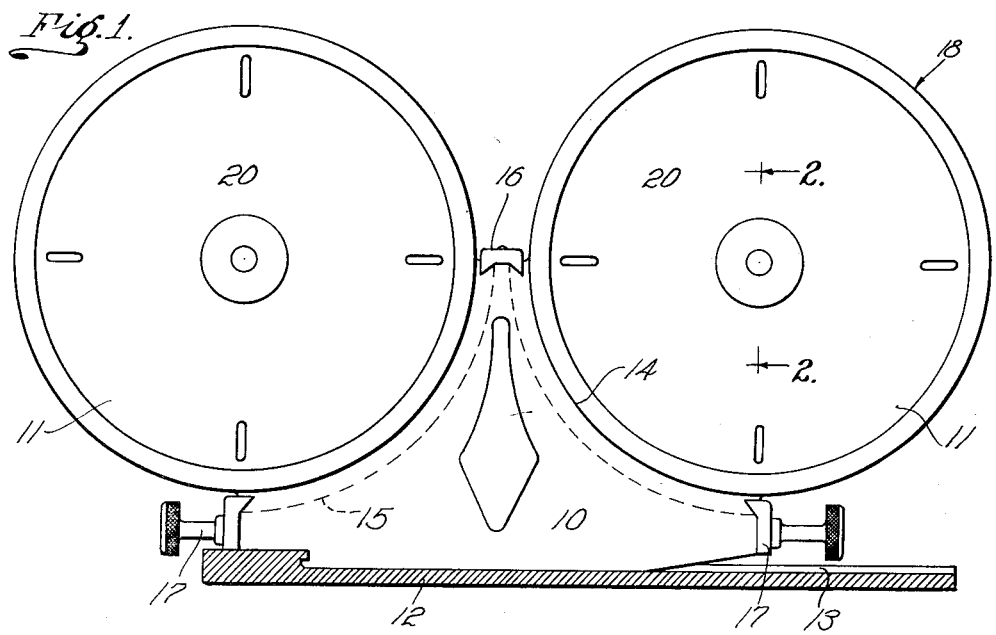
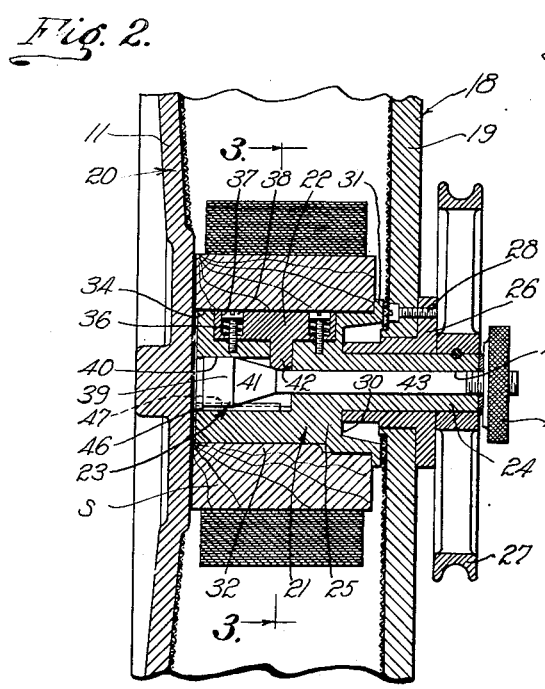
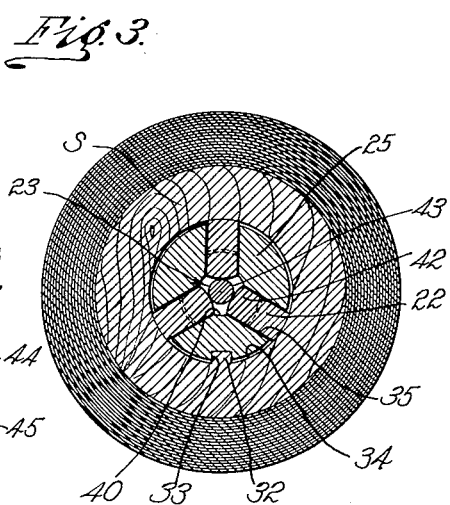
Inventor
Gabriel Garcia Moreno
By
His Attorney Patented May 8, 1934

1,957,974

UNITED STATES PATENT OFFICE 1,957,974

FILM MAGAZINE

Gabriel Garcia Moreno, Los Angeles, Calif., assignor to Moreno-Snyder Cine Corporation, Ltd., Los Angeles, Calif., a corporation of Delaware Application June 29, 1931, Serial No. 547,641

8 Claims. (Cl. 242—71)

This invention relates to a device for handling film and relates more particularly to a film magazine for carrying film reels and spools. It is a general object of the present invention to provide a film magazine having improved and effective means for carrying or mounting film reels and spools.

Motion picture film and sound film or film for receiving sound records are initially wound on spools of wood or metal. The openings in the spools carrying the film vary considerably in diameter and are often irregular or untrue. When the film spools are used in the common forms of film magazines of motion picture cameras and sound recording apparatus, they often fit the spindles of the magazines loosely so that they wobble and have end movement. When rotating, these movements of the spools produce considerable noise, which is particularly undesirable in the recording of sound pictures.

An object of the present invention is to provide a film magazine for use on a motion picture camera or sound recording apparatus that is adapted to carry or rotatably support the usual forms of film spools for operation without undesirable movement or noise.

Another object of the present invention is to provide an arbor or spindle construction for a film magazine that is provided with a clutch means for effectively gripping and holding the spools on which the film is initially wound.

Another object of the invention is to provide a spindle construction for a film magazine that is operable to effectively handle or carry film reels and spools varying in size and shape. The device provided by the present invention is adaptable or adjustable to carry film reels and spools of varying internal diameters and of irregular shape and mounts such reels and spools so that they do not have any free movement on the spindle.

Another object of the invention is to provide an arbor or spindle construction of the character mentioned in which the clutch or spool-gripping means can be readily adjusted manually to effectively handle spools varying in internal diameter and having openings of irregular configuration.

It is another object of the invention to provide a spindle for a film magazine on which the film reels and spools may be effectively mounted and centered so as to operate in the proper manner.

Another object of the invention is to provide a film magazine spindle of the character mentioned that is such that the film reels and spools may be easily and quickly mounted for operation.

A further object of the invention is to provide a film magazine having a reel and spool spindle of the character mentioned that is simple and compact and that is inexpensive of manufacture.

Other objects and features of my invention will be best and more fully understood from the following detailed description of a typical form and application of the invention, throughout which description reference will be had to the accompanying drawing, in which:

Fig. 1 is a side elevation of a pair of magazines of the character provided by the present invention, illustrating them mounted on a suitable base. Fig. 2 is an enlarged vertical detailed sectional view taken as indicated by line 2—2 on Fig. 1, and Fig. 3 is a transverse detailed sectional view taken as indicated by line 3—3 on Fig. 2.

In accordance with the broader aspects of the invention, the spindle or arbor construction may be embodied in film magazines of various types and constructions and for handling different forms of film spools. Throughout the following detailed description, the invention will be disclosed as embodied in a magazine construction of the general character fully described and claimed in my co-pending application entitled Film magazines and carrier for the same, Serial Number 548,934 filed July 6, 1931. Further, the invention will be disclosed in a form that is adapted to handle the usual or common types of film reels and spools. It is to be understood that the invention is not to be construed as limited or restricted to the specific type of magazine and film spool illustrated in the drawing, but that it is to be taken as including any features or modifications that may fall within the scope of the claims.

The apparatus or magazine construction illustrated in the drawing includes a base 10 adapted to be mounted on a camera, or the like, and two film magazines 11 detachably mounted on the base 10. The base 10 is supported on a plate 12 and is retained in a channel 13 in the upper side of the plate. The two film magazines 11 may be identical and are drum-like in their general configuration. The base 10 is provided with concaved portions 14 for receiving edge portions of the two magazines 11. Ribs or flanges 15 are provided on the edges of the magazines 11 to fit into the concaved parts 14 of the base. A clip 16 engages the upper ends of the flanges 15, while clamping members 17 engage the lower ends of the flanges to detachably secure the two reels 11 on the base 10. The present invention is concerned primarily with the spool and reel supporting means or spindles of the magazines, and I will proceed with a detailed description of one of the magazines 11 and particularly of its spindle construction, it being understood that such description may apply to both of the magazines.

The film magazine provided by the present invention includes, generally, a case or body 18 having a rigid or stationary end 19 and a detachable end or cover 20, an arbor or spindle 21 carried by the fixed end 19 of the body, spool-engaging or clutch members 22 shiftably carried by the spindle 21, and means 23 for operating the clutch members 22 outwardly to co-operate with the film spool S.

The case or body 18 of the magazine is similar, generally, to the bodies of the usual forms of film magazines, that is, it is circular and is hollow to contain the reels and film spools. The opposite ends 19 and 20 of the magazine are spaced apart in the usual manner and may be substantially parallel.

The arbor or spindle 21 is provided to carry a film spool in the magazine and is rotatably supported by the end 19 of the magazine. In the particular construction illustrated in the drawing, the spindle 21 is integral and consists of an outer end part 24 of reduced diameter and a main or inner part 25 to carry the spool S. A suitable bearing 26 is arranged in a central opening in the end 19 to rotatably support the spindle. The outer end portion 24 of the spindle extends through the bearing 26 to project from its outer end. A pulley 27 is fixed on the projecting end of the spindle so that the spindle may be driven or rotated. The bearing 26 is secured to the end 19 of the magazine by a screw 28.

The inner portion 25 of the spindle is of round cross sectional configuration, and is proportioned to effectively carry or mount the common types of film reels and spools. The inner portion 25 of the spindle extends transversely through the magazine and has its inner end adjacent the cover 20. The bearing 26 may project into the interior of the magazine, and the spindle may be relieved or provided with a socket 30 to receive the inwardly projecting end of the bearing. The bearing engages the end of the socket 30 to hold the spindle against longitudinal movement. A radial flange 31 is provided on an end of the spindle to engage an end of the spool S and space it from the end 19. The particular film spool S illustrated in the drawing is provided with a spline or key 32 and a keyway 33 is provided in the main portion 25 of the spindle to receive the key. Film spools are sometimes provided with pins for engaging the spindles of the film magazines, and the spindle 21 may be provided with a suitable slot for receiving such a pin, it being understood that the spindle 21 may be modified to adapt it to handle film spools of any specific construction.

The clutch members 22 are shiftably carried by the spindle 21 and are operable to engage the walls of the opening 34 of the spool S. There may be any suitable number of like clutch members 22, there being three members 22 in the embodiment of the invention illustrated in the drawing. The clutch members 22 are mounted for radial movement in slots or openings 35 extending longitudinally in the main portion 25 of the spindle. The openings 35 are preferably equally or symmetrically spaced around the spindle. The clutch members 22 are slidable or shiftable radially in the elongated openings 35 and are proportioned so that their outer sides are flush with the exterior of the spindle when their inner sides rest on the bottoms of the openings. The outer edges or ends of the clutch members 22 are preferably rounded to effectively conform to and clamp against the walls of the opening 34.

The invention provides means for normally yieldingly holding the members 22 in the in positions where they do not project from the spindle and for returning them to this position after actuation. Helical or spiral springs 36 are arranged in spaced radial sockets 37 in the members 22. The springs 36 are arranged under compression between the bottoms of the sockets 37 and heads on the outer ends of screws 38. The heads of the screws 38 are within the sockets 37 so as to have their outer ends flush with or within the exterior of the spindle portion 25. The springs 36 operate to normally yieldingly hold the members 22 in positions where they engage the bottoms of the openings 35 and do not project from the spindle.

The means 23 is provided to force or operate the members 22 outwardly into engagement with the spool S and to maintain them in pressural engagement with the spool so that it is held against movement relative to the spindle 21. The means 23 is in the nature of a wedge means and includes a wedge or wedge head 39 slidable in a longitudinal opening 40 in the main portion 25 of the spindle. The wedge head 39 is provided with a cylindrical portion to slidably fit the opening 40 and a conical or wedge portion 41. Each of the members 22 is provided with an inwardly projecting finger or lug 42. The lugs 42 project into the opening 40 and are adapted to be engaged by the inclined face 41 of the wedge head. The tapered or inclined portion 41 of the wedge head is of round cross section, while the inner ends of the lugs 42 are rounded so as to have line or point of contact with the wedge. It will be apparent that movement of the wedge head in the direction of the end 19 of the magazine causes simultaneous outward movement of the clutch members 22.

The invention provides means for operating or shifting the wedge head whereby the clutch members 22 may be operated as desired. A stem 43 is provided on the wedge head and is slidable in a central longitudinal opening 44 in the spindle 21. The stem 43 projects outwardly from the end portion 24 of the spindle, and a thumb screw or nut 45 is threaded on its projecting end. The nut 45 is adapted to engage or react against the end 24 of the spindle to cause longitudinal movement of the stem 45 and wedge head 39. A suitable bushing or washer may be arranged between the thumb screw or nut 45 and the projecting end part 24 of the spindle. A sliding key connection is provided to hold the wedge head and stem 43 against rotation relative to the spindle during threading of the thumb screw 45. A key 46 is provided on the walls of the opening 40 to slidably fit a keyway 47 in the wedge head. It will be apparent how threading of the nut 45 causes longitudinal movement of the wedge head and radial movement of the members 22.

It is believed that the practicability and utility of the film magazine construction provided by the present invention will be readily apparent from the foregoing detailed description. The cover 20 of the magazine may be removed to permit the arrangement of a reel or the spool S on the spindle 21. The nut or thumb screw 45 may be operated to a position where the clutch members 22 are fully retracted to allow the reel or spool to be slid onto the spindle. The flange 31 limits the inward movement of the spool on the spindle so that it may be readily arranged in the proper position. The thumb screw or nut 45 may be threaded against the projecting end part 24 of the spindle to shift the wedge head 39 in the direction of the end 19 so that the clutch members are forced outwardly into pressural engagement with the walls of the opening 34 of the spool. It will be apparent how the symmetrically spaced clutch members 22, in being operated outwardly in unison, effectively center the spool on the spindle and hold it against movement relative to the spindle. The members 22 are adapted to effectively connect spools of irregular internal configuration and diameter with the spindle 21 so as to operate without any undesirable movement on the spindle. Further, it will be apparent how the clutch members 22 are operable to effectively engage and hold spools and reels of various internal diameters so as to adapt the spindle 21 for carrying various sizes and forms of spools. The reel or spool may be readily released from the spindle by outward threading of the nut or thumb screw 45 which permits the clutch members 22 to retract within the openings 35. After the clutch members have been retracted by the springs 36, the reel or spool may be easily removed or slid from the spindle 21. The invention provides a spindle construction for a film magazine that is adapted to effectively carry film reels and spools that would have loose fits with the usual type of magazine spindles, and a spindle construction that may be readily operated or adjusted to securely hold and carry the reels and spools.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A film magazine including spaced ends, one of said ends being rigid and the other being removable, a spindle rotatably carried by the rigid end and adapted to carry a film spool, the spindle having an elongate longitudinal opening in its periphery, a clutch member carried in said opening and operable to engage the spool and hold it against movement relative to the spindle, and means controllable at the outer side of one of said ends for actuating the member.

2. A film magazine including spaced ends, one of said ends being rigid and the other being removable, a spindle rotatably carried by the rigid end and adapted to carry a film spool, the spindle projecting outwardly beyond said end to carry a pulley, a clutch member carried by the spindle, and means for actuating said member to grip a spool including a screw-threaded member at said projecting end of the spindle.

3. A film magazine including spaced ends, one of said ends being rigid and the other being removable, a spindle rotatably carried by the rigid end and adapted to carry a film spool, the spindle projecting outwardly beyond said end to carry a pulley, a clutch member carried by the spindle, and means for actuating said member to grip a spool including a screw-threaded member at said projecting end of the spindle, and a wedge operable by said screw-threaded member to actuate the clutch member.

4. A film magazine including, spaced ends, one end being rigid, the other being removable, a spindle rotatably carried by one of said ends and adapted to extend between the ends to carry a film spool, the spindle having a substantially central opening and circumferentially spaced openings in its periphery in communication with the first mentioned opening, members shiftably carried in said spaced openings and operable to engage the spool, and means carried in the first mentioned opening for actuating the members and controllable from the outer side of one of said ends.

5. A film magazine including, spaced ends, one end being rigid, the other being removable, a spindle rotatably carried by one of said ends and adapted to extend between the ends to carry a film spool, the spindle having a substantially central opening, and circumferentially spaced openings in its periphery in communication with the first mentioned opening, members shiftably carried in said spaced openings and operable to engage the spool, a wedge in the first mentioned opening operable to simultaneously actuate the members outwardly into engagement with the spool, and means for actuating the wedge.

6. A film magazine including, spaced ends, one end being rigid, the other being removable, a spindle rotatably carried by one of said ends and adapted to extend between the ends to carry a film spool, the spindle having a substantially central opening and circumferentially spaced openings in its periphery in communication with the first mentioned opening, members shiftably carried in said spaced openings and operable to engage the spool, a wedge in the first mentioned opening operable to simultaneously actuate the members outwardly into engagement with the spool, and screw means at the outer side of said end carrying the spindle for actuating the wedge.

7. A film magazine including, spaced ends, one end being rigid, the other being removable, a spindle rotatably carried by one of said ends and adapted to extend between the ends to carry a film spool, the spindle having a substantially central opening, and a peripheral opening in communication with the substantially central opening, a shiftable clutch member in the peripheral opening operable to engage a film spool on the spindle, a wedge in the substantially central opening operable to actuate the member into engagement with the spool, and an actuating stem on the wedge projecting from the outer side of the end carrying the spindle.

8. A film magazine including, spaced ends, one end being rigid, the other being removable, a spindle rotatably carried by one of said ends and adapted to extend between the ends to carry a film spool, the spindle having a substantially central opening and a peripheral opening in communication with the substantially central opening, a shiftable clutch member in the peripheral opening operable to engage a film spool on the spindle, a wedge in the substantially central opening operable to actuate the member into engagement with the spool, a stem on the wedge projecting from the outer side of the end carrying the spindle, and means on the stem for actuating the wedge.

GABRIEL GARCIA MORENO.